Sept. 4, 1928.
C. C. RUNNER
1,683,210
MOTOR CONTROL APPARATUS
Filed Aug. 6, 1925
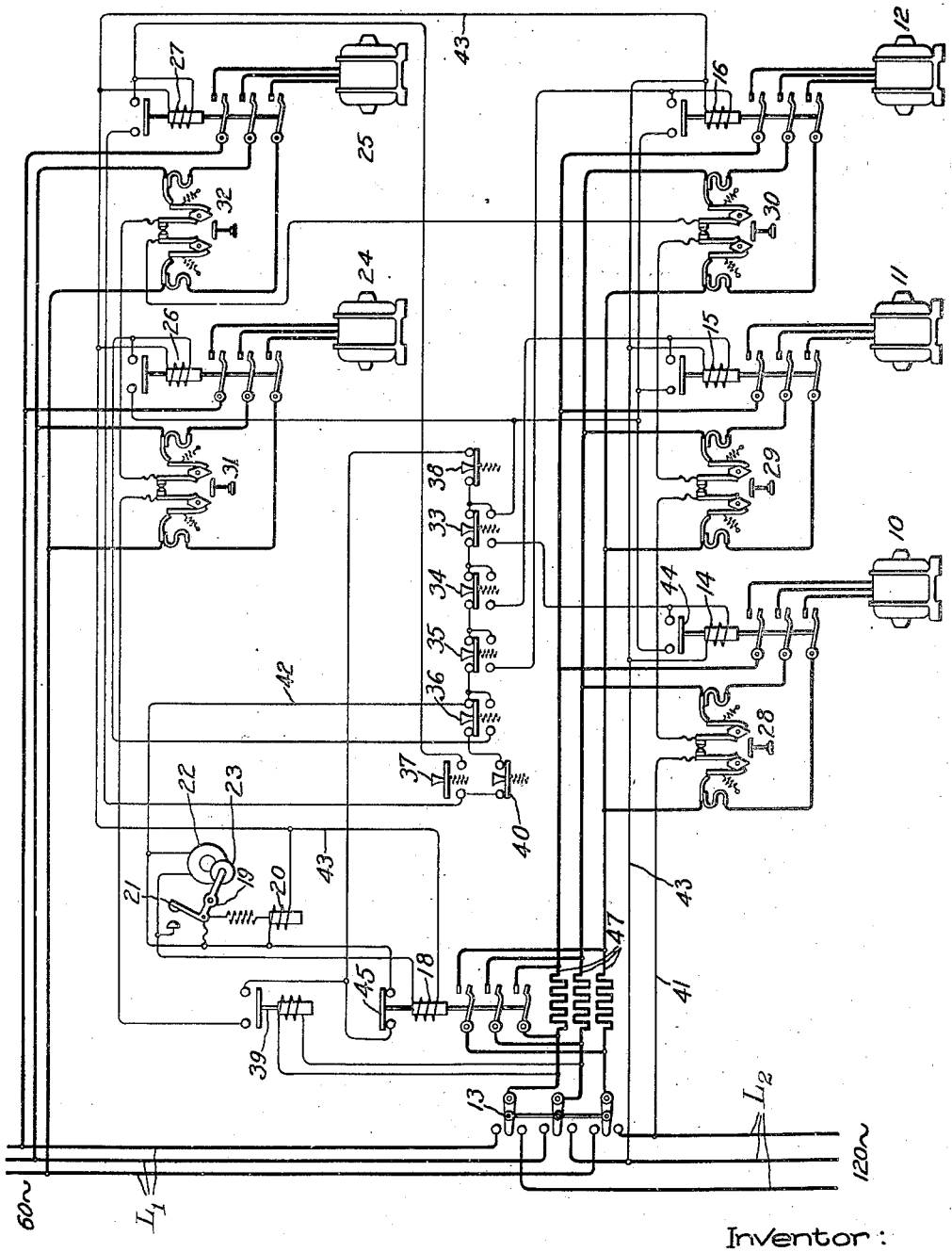
Inventor:
Claude C. Runner,
by
His Attorney.

Patented Sept. 4, 1928.

1,683,210

UNITED STATES PATENT OFFICE.

CLAUDE C. RUNNER, OF SCHENECTADY, NEW YORK, ASSIGNOR TO GENERAL ELECTRIC COMPANY, A CORPORATION OF NEW YORK.

MOTOR-CONTROL APPARATUS.

Application filed August 6, 1925. Serial No. 48,636.

My invention relates to the control of electric motors and provides improved control apparatus for connecting the motors to a source of current and automatically limiting the current of the motors during the starting period.

Although well adapted for controlling a single motor of a type that requires limitation of the motor starting current, the control apparatus embodying the present invention is particularly advantageous in controlling a plurality of motors which it is desired to start successively with the starting current of each motor of limited value. By means of the present invention the starting current of each of a plurality of motors may be limited by a single current limiting resistor.

In carrying the invention into effect in a control system for a plurality of motors, a separate line switch is provided for connecting each motor to a source of supply and in accordance with the preferred form of the invention, a current limiting resistor is connected in the circuit through which all the motors are supplied with current. The current limiting resistor is normally short circuited by a switch which is arranged to be operated so as to insert the resistance in the motor circuit prior to operation of each of the motor line switches, thus insuring that the starting current of each motor is of limited value. A time element device automatically controls the resistor short circuiting switch in such manner that the short circuit around the current limiting resistor is reestablished a predetermined time interval after each insertion of the resistor in the motor circuit.

Although not necessarily limited thereto, the present invention is well adapted for controlling a group of motors driving a machine such, for example, as a multi cutter head woodworking machine. Where the control apparatus, as well as the driving motors, is mounted upon the driven machine my invention permits a considerable reduction in the space required for the controlling apparatus.

In the accompanying drawing the single figure is a schematic diagram of a control system embodying my invention in a form suitable for controlling a plurality of electric motors. The control system illustrated is designed for controlling the several driving motors of a multi cutter head woodworking machine.

Referring to the drawing, the electric driving motors 10, 11 and 12, are shown as of the three phase alternating current induction type, although the present invention may be applied with equal advantage to control other types of motors. While not shown in detail in the drawing, it will be understood that each of the motors 10, 11 and 12 may be connected to drive one of the cutting heads of a multi head woodworking machine. The group of electric motors comprising the motors 10, 11, 12 is arranged to be supplied with power from either the low frequency supply lines $L_1$ or the high frequency supply lines $L_2$ through a suitable selective switch 13. The electroresponsive line switches 14, 15 and 16 are provided for connecting the motors 10, 11 and 12 respectively to either supply lines $L_1$ or $L_2$, depending upon the previous operation of the selective switch 13.

In order to limit the current supplied to each of the motors 10, 11, 12, during the starting period, the current limiting resistors 47 are connected in the circuit through which the motors are supplied with power and the electroresponsive switch 18 is provided for short circuiting the resistors 47 during normal operation of the motors.

In accordance with the present invention the electroresponsive switch 18 which controls the short circuit around the current limiting resistors 47 is normally closed so as to short circuit the resistors 47 before and during operation of any one of the group of motors 10, 11, 12. Thus when the switch 18 is of the type which is operated to the closed position upon energization of the operating winding thereof as shown in the drawing, the operating winding of the switch is connected so as to be energized before, as well as during, the operation of any of the group of motors 10, 11, 12, as will be more fully described in connection with the operation of the control system illustrated. It will be understood, however, that if desired the resistance controlling switch 18 may be of the type which is normally biased to the closed position and operated to the open position upon the energization of the operating winding. In either case suitable time element means are provided for maintaining the short circuit around the resistors 47 open for a predetermined time interval.

In the arrangement shown a time element relay 19 of the type fully described and broadly claimed in Patent No. 1,638,372, issued August 9, 1927 to George E. Stack, and assigned to the assignee of my present invention, is provided for controlling the switch 18. As will be more fully described hereinafter, the time element control arrangement is such that the current limiting resistors 47 are maintained inserted in the circuit through which power is supplied to the group of motors 10, 11 and 12 for a predetermined time interval during the starting of each motor in the group.

It will be seen that the time element relay 19 is provided with a winding 20 for operating the normally open contact 21 to the closed position and the winding 22 serves to retard the operation of the contact 21 by periodically holding and releasing the movable magnetic member 23 when energized from an alternating current source. I would have it understood, however, that my present invention is not limited to any particular type of time delay means for controlling the operation of the resistance short circuiting switch 18.

Motors 24 and 25 also are shown as of the three phase alternating current type and are mechanically connected by means not shown in the drawing to individually drive a cutting head of the woodworking machine. The motors 24 and 25 are arranged to be supplied with power only from the low frequency supply lines L₁ and these motors are of such a size that they may be connected directly to the supply lines upon operation of the corresponding electroresponsive line switches 26 and 27.

It will be observed that the electric motors 10, 11, 12, 24, 25 are protected by means of the thermal responsive devices 28, 29, 30, 31, 32, respectively, each of which is connected to be heated in accordance with the line current of the corresponding motor. The thermal responsive devices may be of any desired form, or may be omitted if desired, as they form no part of my present invention.

The manually operated push buttons or master switches 33, 34 and 35, are arranged to establish energizing circuits for the line switches 14, 15 and 16 respectively, and thereby control the starting of the corresponding motors 10, 11, 12. The line switches 26 and 27 of the corresponding motors 24 and 25 are controlled by the manually operated push buttons or master switches 36 and 37 respectively. It will be seen that the motor starting push buttons 33, 34, 35 and 36, are of the two-position type having both upper and lower contacts, and are normally biased into engagement with the upper contacts. When each of these push buttons is depressed to start the motor controlled thereby, the upper contacts are opened an interval before the power contacts are closed. The stopping of all of the motors 10, 11, 12, 24 and 25, is controlled by the normally closed push button 38, as well as by the undervoltage protective relay 39, which is energized responsively to the voltage impressed upon the group of motors 10, 11 and 12 as shown in the drawing. The motor 25 may be stopped separately by operation of the normally closed push button 40.

The operation of the control system illustrated is as follows: With the supply line L₁ energized from a suitable alternating current source of suitable frequency, such for example, as 60 cycles, and the supply lines L₂ energized from an alternating current source of a relatively higher frequency such, for example, as 120 cycles, the selective switch 13 may be operated to supply power to the group of motors 10, 11 and 12, from either the supply lines L₁ or the supply lines L₂. This permits the cutter heads of the woodworking machine to be driven by the motors 10, 11, 12 at either low speed or high speed, depending upon the nature of the cutting operation, as well as the nature of the wood being operated upon.

Assuming that the selective switch 13 is operated to its lower position to operate the group of motors 10, 11 and 12, from the high frequency supply lines L₂, the undervoltage responsive relay 39 then is energized by the voltage across one phase of the supply lines L₂ and operates to the circuit closing position. This at once establishes an energizing circuit for the operating winding 20 of the time element relay 19 which may be traced from the right hand supply line L₂ through the conductor 41, the contacts of the several termal overload protective devices 28, 29, 30, 32 and 31, and thence through the contact of the undervoltage relay 39, the normally closed push button 38, the upper contacts of the several motor starting push buttons 33, 34 and 35, the conductor 42, the operating winding 20 and the conductor 43 to the middle supply line L₂. The resulting energization of the operating winding 20 starts operation of the contact 21 to the closed position. At the same time, the retarding winding 22 of the time element relay 19 and the operating winding of the resistance controlling switch 18 are energized in parallel circuit with the operating winding 20.

It will be observed that the retarding winding 22 and the operating winding of switch 18 are energized in series circuit. In this way the resistance of the retarding winding 22 serves to limit the current passing through the operating winding of switch 18 to a value which is insufficient to effect operation of the switch 18 to the closed position. However, the current passing through the retarding winding 22 is of sufficient value to periodically attract the magnetic member 23 and thereby delay the operation of the contact 21 to the closed position for a predetermined time interval. When the contact 21 is closed the retarding winding 22 is short circuited. This results in increasing the energizing current of the operating winding of the switch 18 and the latter thereupon is operated to the closed position to short circuit the current limiting resistors 47.

With the switch 18 thus operated to its initial position in which the current limiting resistors 47 are short circuited any one of the motor starting push buttons 33, 34, 35, may be operated to set the corresponding motors 10, 11, 12, into operation, although it will be observed that the push button starting switches are interlocked electrically so that only a single motor can be started at any one time.

If the motor 10 is to be started first, the starting push button 33 is depressed. As the push button 33 disengages its upper contacts the energizing circuit through the conductor 42 for the operating winding of the resistor controlling switch 18 is interrupted and switch 18 immediately opens to insert the current limiting resistor 47 in the circuit prior to the connection of the motor 10 thereto. As the push button 33 engages with its lower contacts an energizing circuit for line switch 14 is established extending through the conductor 41, contacts of the thermal devices 28 to 32, the undervoltage relay 39, the normally closed stop push button 38, the push button 33 in its lower position, the operating winding of line switch 14, and the conductor 43. The resulting closure of line switch 14 simultaneously establishes a holding circuit through the auxiliary contact 44 with which the switch is provided and connects motor 10 to the supply lines L₂ with the current limiting resistors 47 in the motor circuit. The motor 10 at once starts and soon accelerates to normal running speed, the starting and the accelerating current of the motor being limited to a suitable value by the resistors 47.

When the upper contacts of the push button 33 were opened to deenergize the switch 18 and thereby inserting the resistors 47 in the motor circuit, the operating winding 20 of the time element relay 19 also was deenergized, thus permitting the contact 21 to immediately return to the open position in which it is shown. However, as soon as the resistance controlling switch 18 is opened, the winding 20 at once is reenergized through the auxiliary contact 45 with which the switch 18 is provided. Thus, upon the opening of the switch 18 to insert the resistors in the motor circuit, the contact 21 of the time element relay 19 immediately is set into operation to the closed position to reenergize the operating winding of switch 18 after a predetermined time interval.

In case the motor starting push button 33 is not released so as to close its upper contacts before the contact 21 of the time element relay 19 is operated to the closed position, the switch 18 is energized only momentarily since its energizing circuit as well as the energizing circuit of the relay operating winding 20 is interrupted at the auxiliary contact 45 when the switch 18 responds to the momentary energization of its operating winding. Thus, it will be seen that as long as the motor starting push button 33 is maintained depressed the time element relay 19 operates to momentarily energize the operating winding of switch 18 at recurring intervals.

However, when the motor starting push button 33 is released as soon as the motor 10 is started and before the time element relay 19 operates to close its contact 21, as will be the case under all ordinary operating conditions, the switch 18 is maintained in the open position only for the time interval required for operation of the relay 19. This is due to the fact that the push button 33 in its upper position maintains the operating winding of switch 18 energized through a circuit which is in shunt circuit with the auxiliary contact 45 of the switch 18. Thus, under normal operating conditions the switch 18 and the time element relay 19 function to maintain the current limiting resistors 47 effective to limit the current of the motor for only a predetermined time interval after the motor is connected to the source of supply.

After motor 10 is set into operation with the current limiting resistors 47 in circuit with the motor for a predetermined time interval during the starting period, one of the motors 11, 12, may be set into operation by depressing the corresponding push buttons 34 or 35. When one of the push buttons 34 or 35 is depressed the switch 18 again is operated just prior to the connection of the corresponding motor to the supply lines so as to insert the current limiting resistors 47 in the motor circuit for a predetermined time interval in exactly the same manner as previously described in connection with the starting of the motor 10. In each case the switch 18 responds when the push button disengages its upper contacts and opens the short circuit around the resistors 47 prior to operation of the motor line switch which follows immediately upon the engagement of the push button with its lower contacts. The time element relay 19 serves to delay reclosure of the switch 18 and thus maintains the short circuit around the current limiting resistors 47 open for a predetermined time interval. In this way the current limiting resistors 47 maintain the starting current of each of the group of motors 10, 11, 12 within desired limits and the resistor controlling switch 18 is returned automatically to its initial position a time interval after each motor is started.

With the selective switch 13 operated so as to energize the group of motors 10, 11, 12 from the low frequency supply lines $L_1$, the operation of the motor controlling switch mechanism illustrated is exactly the same as previously described except that the undervoltage protective relay 39 is energized responsively to the voltage of the supply lines $L_1$ and hence no further description is necessary.

The motors 24, 25, may be set into operation at any time the undervoltage relay 39 is closed by depressing the corresponding motor starting push button 36 or 37. In each case the motor is connected directly to the low frequency supply lines $L_1$ since the motors are of such a size as to not require limitation of the starting current thereof. As previously pointed out, any of the motors 10, 11, 12, 24, 25, which may be in operation are stopped upon operating the normally closed stop push button 38, while the motor 25 may be individually stopped by operating the normally closed stop push button 40.

While I have described and illustrated the preferred embodiment of my invention, it will be evident to those skilled in the art that various changes and modifications may be made therein without departing from the spirit of the invention or from the scope of the appended claims.

What I claim as new and desire to secure by Letters Patent of the United States is:—

1. In a motor control system, the combination with an electric motor, of means including a switch operable from one position to a second position for connecting the motor to a source of current upon operation of said switch to said second position and return thereof to the first position, means for limiting the current of the motor, said means normally being ineffective, and means set into operation upon operation of said switch from said one position for rendering said current limiting means effective prior to operation of said switch to said second position and for a predetermined time interval after the return of said switch to said one position.

2. In a motor control system, the combination with an electric motor, of electroresponsive starting switch mechanism for the motor, means for limiting the current of the motor during starting, said means normally being ineffective, a control switch therefor biased to one position and connected to effect operation of the electroresponsive starting switch to connect the motor to a source of current upon a momentary operation of the control switch to a second position and having means associated therewith for rendering said current limiting means effective prior to the connection of the motor to the source of current, and electrically operated time element means set into operation under the control of said control switch for maintaining the current limiting means effective for a predetermined time interval after the return of said controlling switch to said one position in accordance with its bias.

3. In a motor control system, the combination with an electric motor, of electroresponsive starting switch mechanism for connecting the motor to a source of supply, a control switch therefor operable from one position to a second position for effecting operation of said starting switch mechanism, a normally short circuited resistor in circuit with the motor, and normally energized time element electroresponsive switch mechanism under the control of said control switch and arranged to be de-energized to remove the short circuit from said resistor prior to the operation of said starting switch mechansim to start the motor and to maintain the short circuit removed from said resistor for a predetermined time interval.

4. In a motor control system, the combination with an electric motor, of an electroresponsive line switch for connecting the motor to a source of current, a normally energized electroresponsive switch operable upon deenergization thereof from an initial position to another position to limit the current of the motor, a common control switch for successively deenergizing said current limiting switch and energizing said line switch to start the motor with limited current, and time element circuit controlling means set into operation under the control of said common control switch for automatically effecting the return of the current controlling switch to said initial position after a time interval.

5. In a motor control system, the combination with an electric motor, of an electroresponsive line switch for connecting the motor to a source of current, a normally energized electroresponsive switch operable upon de-energization thereof from an initial position to another position to limit the current of the motor, an electroresponsive time element circuit controlling device for automatically controlling the energization of said current limiting switch under certain conditions, a master switch having two circuit controlling positions, and connections jointly controlled by said master switch and said time element device whereby the said line switch is energized to connect the motor to a source of current after de-energization of the said current limiting switch to effect operation thereof to said other position and the said current limiting switch is re-energized to effect the return thereof to the said initial position after a predetermined time interval.

6. In a motor control system, the combination with a plurality of electric motors having a common supply circuit, of a common current limiting means connected in the common supply circuit for the motors, switch mechanism for successively connecting the motors to said common supply circuit, and cooperating switch mechanism and connections whereby the said current limiting means is inserted in the supply circuit when each motor is connected thereto.

7. In a motor control system, the combination with a plurality of electric motors having a common supply circuit, of a separate switch for connecting each motor to said common supply circuit, a normally short circuited current limiting resistance connected in the common supply circuit for the motors, and electroresponsive circuit controlling means jointly controlled by said separate switches and arranged to open the short circuit around said resistance prior to the connection of each motor to the common supply circuit.

8. In a motor control system, the combination with a plurality of electric motors, of separately operable line switch mechanism for each motor separate operating means for each line switch, a common current limiting resistor connected in the supply circuit for the motors, a normally closed electroresponsive switch for short circuiting said resistor before and during operation of each motor, connections whereby the said electroresponsive switch is operated to the open position to insert said resistor in the supply circuit of the motors upon operation of the corresponding operating means of each of said line switches to start the corresponding motor, and time element means set into operation upon each opening of said electroresponsive switch for maintaining the same open for a predetermined time interval.

9. In a motor control system the combination with a plurality of electric motors, of an electroresponsive line switch for each motor, a master switch for each line switch, a common current limiting resistor for the motors, an electroresponsive switch for controlling the said resistor normally arranged to render the same ineffective before and during operation of each motor, and connections jointly controlled by said master switches whereby upon operation of any master switch the said electroresponsive switch is operated to insert the current limiting resistor in the motor circuit prior to operation of the corresponding motor line switch.

10. In a motor control system, the combination with a plurality of electric motors having a common supply line, of a current limiting resistance connected in the supply line for the motors, a separate electroresponsive line switch for each motor, a separate master switch for controlling each line switch, a normally closed electroresponsive switch for short circuiting the said resistor, a time element circuit controlling device associated with said normally closed electroresponsive switch and arranged to be set into operation upon the operation of said switch to the open position, and connections jointly controlled by each master switch and said time element device whereby the said normally closed electroresponsive switch is operated to the open position upon operation of any master switch to effect operation of the corresponding motor line switch and is reclosed after a predetermined time interval.

11. In combination in a system of motor control, a plurality of electric motors having a common supply circuit, selectively operable switch mechanism for connecting said motors to said common supply circuit in a sequence as determined by the operation of said switch mechanism, a common automatically operated acceleration controlling means connected in the common supply circuit for said motors, and connections between said switch mechanism and said means necessitating that each of said motors be placed under the control of said means upon the connection of the motor to the common supply circuit.

12. In combination in a system of motor control, a plurality of electric motors having a common supply circuit, selectively operable switch mechanism effective to connect said motors to said common supply circuit in an order determined by the order of operation thereof, a common automatically operated acceleration controlling means connected in the common supply circuit for said motors, and connections between said switch mechanism and said means requiring said means to be in operative condition prior to the connection of each motor to the common supply circuit and necessitating that each of said motors be placed under the control of said means upon the connection of the motor to the common supply circuit.

In witness whereof I have hereunto set my hand this 5th day of August, 1925.

CLAUDE C. RUNNER.